3,341,741
APPARATUS AND METHOD FOR AUTOMATIC GROUND FAULT CLEARING
Edwin K. Swimmings, Ottawa, Ontario, Canada, assignor to Her Majesty in right of Canada, as represented by the Minister of Mines and Technical Surveys
Filed June 5, 1964, Ser. No. 372,989
4 Claims. (Cl. 317—18)

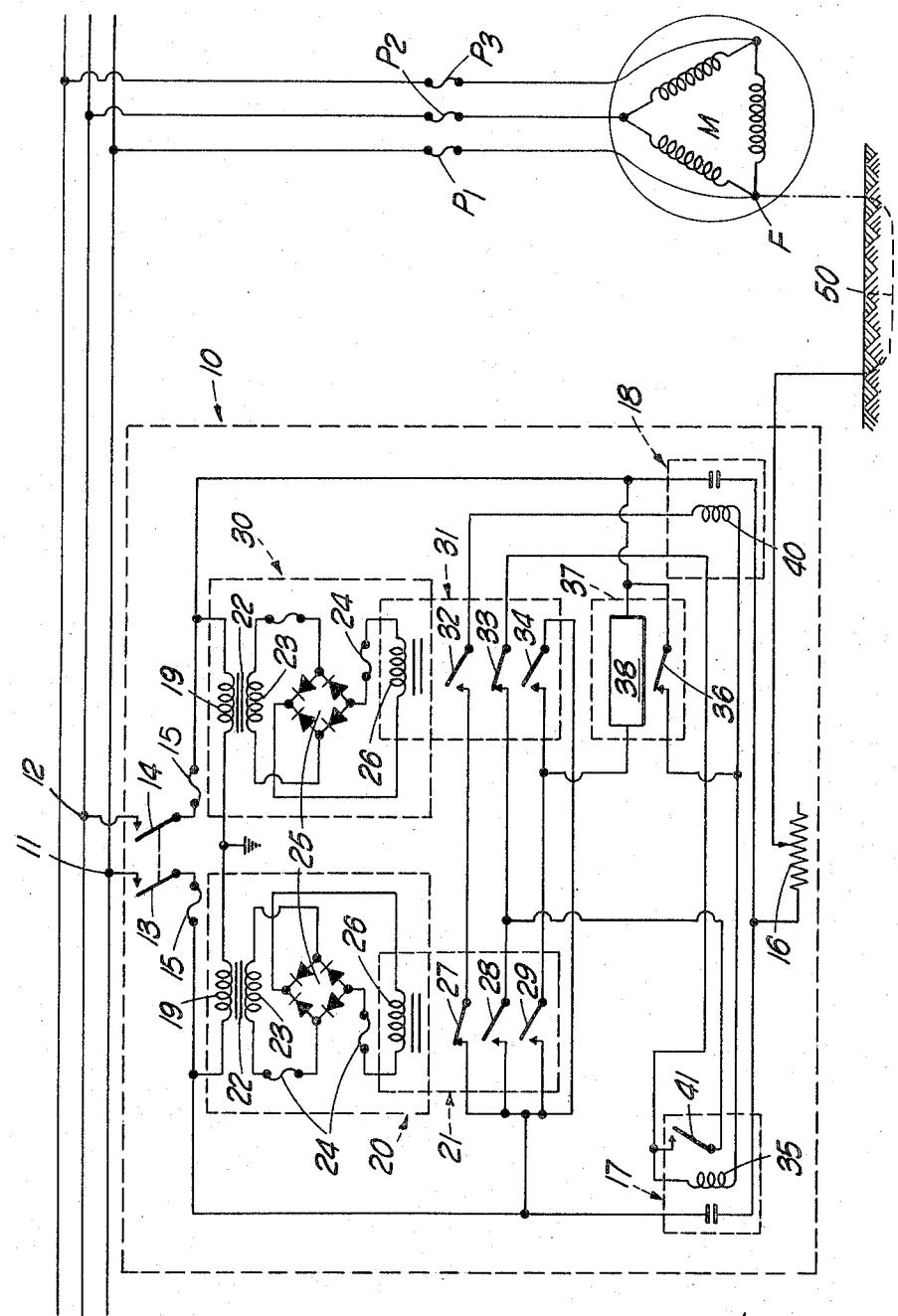

ABSTRACT OF THE DISCLOSURE

Ground fault clearing apparatus for connection to a transformer bank or secondary panel of a delta connected three-phase distribution system for effecting remote actuation of an overcurrent protective device closest to the ground fault. The apparatus includes a detector which causes actuation of switch contacts upon occurrence of over-voltage indicating a ground fault associated with one of the phases, the switch contacts thereby completing a tripping current deriving circuit which feeds a controlled amount of current from one of the other phases to ground so as to establish a return current through the ground fault to the faulted phase and effect actuation of the overcurrent protective device nearest the fault and thus disconnect the faulted apparatus from the system.

---

This invention relates to a method and apparatus for clearing automatically ground faults in ungrounded three-wire power distribution systems.

Short circuits to ground (or "ground faults" as they are commonly referred to) on delta-connected three-phase power distribution and utilization systems are undesirable for a number of reasons. Firstly, the insulation provided on apparatus connected to the system can be subjected upon the occurrence of ground faults to voltage stress substantially in excess of its normal rating. This is so because in (say) a delta-connected 575 VAC system, the voltage between each phase and ground is normally 330 VAC. If, however, a ground fault occurs between one of the phases and ground, the voltage between the other two phases and ground becomes the full line-to-line voltage—i.e. 575 VAC. It follows that the slot or ground insulation in every motor, transformer or heating device connected to the system will be subjected to a voltage of approximately 173% of its normal rating. In such circumstances motors and other equipment with marginal insulation capacity can fail with consequent expense and "down time." Secondly, personnel operating the system run the risk of contacting hazardous and even lethal voltages if the conduit or motor frame containing the conductor associated with the fault is not itself properly grounded. In circumstances of this type, potentials between zero and the full line-to line voltage of 575 VAC can exist between the conduit or motor frame in question and ground, thus providing an exceedingly dangerous situation. Thirdly, intermittent ground faults such as those causing arcing can give rise to dangerous over-voltage transients on the power system which can extend up to several times the normal voltage. Transient over-voltages of this type can, due to certain resonance effects, cause more equipment failures than the ordinary type of "solid" ground fault.

Effects of the type referred to above make it essential that delta-connected three-phase power distribution systems be provided with means for detecting the existence of ground faults. Such, however, is but the initial step in overcoming the problem since, following detection, it is necessary to take steps to locate the ground fault and isolate it from the system. In general, such location is a time consuming and tedious task. In some cases an "educated guess" can narrow the search down to one feeder or one branch circuit supplying a motor and control center or distribution panel. When, however, two or more laboratory or pilot plant type buildings are supplied from one (say) 575 transformer bank, the difficulty of isolating a grounded motor or other ground fault is magnified many times. The conventional method now resorted to in locating and removing a ground fault in these circumstances is simply to open and re-close feeder breakers and/or branch circuit breakers in succession until the ground detecting devices indicate no ground is present. Once the grounded branch circuit has been located in this manner the various motors on it can be shut down one at a time until the faulty motor or supply circuit is located. It is obvious, however, that this method is crude and causes substantial disruption of plant operations since it involves the opening and re-closing of many separate breakers to locate the one relating to that part of the circuit on which the ground fault occurs. Moreover, in many cases it is impossible, due to the nature of the load, to interrupt the power supply in this manner, and the system must remain subject to the ground fault until "runs" are completed and a partial shut down is possible.

It will be apparent from the foregoing discussion that it would be desirable to provide a method and apparatus whereby, through means located as close as possible to the transformer bank or secondary switch board, (hereinafter for convenience referred to as a "central panel") it is possible to trip the overcurrent protection closest to the ground fault giving rise to the trouble. This overcurrent protection may be incorporated in, for instance, a combination magnetic motor starter for one motor or in a molded case circuit breaker or fusible safety switch for a group of motors. If it turns out that the motor which has tripped out is essential to the process or operation then going on, it can be readily started again and kept in service until the ground fault can be removed.

I have found that it is possible to detect and thereafter clear ground faults on delta-connected three-phase power distribution and utilization systems having overcurrent protective devices by a method which comprises the steps of detecting the overvoltage between one of the phases and ground which arises as a result of a ground fault associated with one of the other phases, and thereafter feed a controlled amount of current from the said one phase to ground whereby there is established in the circuit between said ground fault and said other phase a current sufficient to actuate an overcurrent protective device disposed in the circuit adjacent the ground fault. In accordance with my invention, I provide apparatus for carrying out this method adapted for connection to the system at such a central panel which comprises first and second detectors including relays having switch means which are responsive to overvoltage occurring between first and second phases and ground respectively. The apparatus further provides a tripping current deriving circuit associated with the aforementioned switch means for selectively establishing in the circuit between the first phase and ground (when the fault is associated with the second or third phase) or in the circuit between the second phase and ground (when the fault is associated with the first phase) a controlled amount of current whereby there is also established in the circuit between the ground fault and the phase associated therewith a current sufficient to actuate an overcurrent protective device disposed in the last-mentioned circuit adjacent the ground fault.

The invention will be described in connection with the attached figure of drawings which illustrates a circuit for apparatus adapted to carry out my method of automatically clearing ground faults, and which facilitates an explanation of its operation.

The references 1, 2 and 3 represent the three phases of an ungrounded, delta-connected three-phase power distribution system including, among other units, a device (say a motor) M fed from the phases 1, 2 and 3 through overcurrent protective devices $P_1$, $P_2$ and $P_3$ as shown. For the purpose of illustrating the operation of the invention, it will be assumed that a fault F has developed in M adjacent the connection to phase 1. The motor M and its associated feeder circuit including the devices $P_1$, $P_2$, and $P_3$ are of course exemplary of a number of similar feeder circuits connected to the system.

Apparatus according to the present invention is generally illustrated by the circuitry inside the block numbered 10. This comprises (commencing at the top) connections 11 and 12 electrically adjacent a central panel common to a number of branch circuits from any two of the three phases (in the case shown phases 1 and 2 respectively), each of which connections comprise a disconnect switch 13, 14 and fuse or other protective devices 15 as shown. Considering first of all the power handling circuit, it will be noted that the first and second phases are respectively connected to one terminal of a power resistor 16 through first and second contactors 17 and 18 respectively. The other terminal of the variable power resistor is grounded as shown. The first and second phases are also connected to a circuitry and components therein adapted to effect selective actuation of the contactors 17 and 18. This control circuitry comprises a detector and relay associated with each of the said phases, together with a timing relay as will be discussed in more detail hereunder. Referring now to the control circuitry associated with the first phase 1, the voltage between such phase and ground is applied to a first rectifier circuit 20 so arranged as to actuate a first relay 21 when overvoltage between the first phase and ground occurs as a result of a ground fault associated with either the second or third phases. In the particular embodiment of the invention shown in the drawings, the rectifier circuit 20 comprises a transformer 22 having a primary 19 connected between the first phase 1 and ground, and a secondary 23 feeding (with appropriate fuses 24) a full wave bridge 25 of selenium rectifiers the output of which is in turn fed to the coil 26 of the first relay 21. The relay is itself provided with three sets of contacts, comprising a normally closed contact 27, and two normally open contacts 28, 29 as shown. The control circuitry associated with the second phase 2 corresponds to that already described with respect to the first phase, except that the second rectifier circuit 30 (the components of which correspond with, and have the same reference numerals as, the first rectifier circuit 20) feeds a second relay 31 having normally open and normally closed contacts 32 and 33 respectively with a time delay of about three seconds, and an auxiliary instantaneous normally open set of contacts 34 as shown. The combination of the rectifier circuits 20, 30 with their respective relays 21, 31, provide first and second detectors associated with the first and second phases which are adapted, upon the occurrence of overvoltage between such phases and ground, to effect actuation of the respective switch contacts 27, 28, 29 or 32, 33, 34 as the case may be.

It will be noted that according to the drawing, the coil 35 of the first contactor 17 is connected between phases 1 and 2 by a circuit which includes, in series, contacts 28 and 33, and normally closed contact 36 of a timing relay 37 having a motor 38 adapted to open such contacts within a predetermined time delay (say 10 to 15 seconds) following initial actuation of the motor 38. Similarly, the coil 40 of the second contactor 18 is connected between the phases 1 and 2 through a series circuit comprising contacts 27 and 32 of the first and second relays respectively and the normally closed contact 36 of the timing relay 37. Finally, it will be noted that an auxiliary contact 41 associated with the first contactor 17 is connected across the contacts 33 of the second relay so as effectively to "seal in" the first contactor 17 even although contacts 33 of the second relay open after a predetermined time delay.

Considering now the operation of the apparatus, suppose in the first instance that a ground fault F is associated with the first phase as is shown on the drawings. In such circumstances overvoltage will be established between phase 2 and ground with the result that the second relay 31 is actuated. This causes the coil 40 of the second contactor 18 to be connected between the first and second phases by a circuit involving contact 27 of the first relay, the normally open contact 32 of the second relay (which closes after a 3 second delay), and the normally closed contacts 36 of the timing relay 37. Moreover, the motor 38 of the timing relay 37 is put into operation by the instantaneous auxiliary contact 34 of the second relay which completes the connection of the motor between phases 1 and 2. With the second contactor 18 thus actuated, an amount of current (controlled in magnitude by the power resistor) is established between the first and second phases, the current path involving the connection in the apparatus 10 between the second phase, through the second contactor 18 and the power resistor 16 to ground, thence through ground as shown at 50 to the fault F, and thence from the fault through the device M and thence to the first phase through the relative overcurrent protective device $P_1$ as shown. By appropriately adjusting the magnitude of this current, actuation of the overcurrent protective device $P_1$ can be effected, thus removing from the power distribution system the source of the ground fault F causing the difficulty. After a period of 10 to 15 seconds, the motor 38 of the timing relay 37 will cause the normally closed contact 36 of the relay to open, thus disconnecting the coil 40 of the second contactor 18 so as to open the circuit from the second phase. If by the time this occurs the ground fault F has not been cleared from the system, attempts can be made to effect actuation of the overcurrent protective device $P_1$ by increasing the current flow by appropriate adjustments of the power resistor 16 or, if this is not effective, attempts will have to be made to locate the ground fault and isolate it by more conventional means.

If the ground fault occurs in circuitry associated with the second phase, overvoltage will be developed between phase 1 and ground, thus causing actuation of the first relay 21. When such occurs, contact 28 will close so as to complete the circuit (which includes also normally closed contacts 33 of the second relay 31 and the normally closed contacts 36 of the timing relay 37) connecting the coil 35 of the first contactor 17 between the first and second phases. This will establish, in the circuit between the first phase and ground, a controlled amount of current regulated by the power resistor 16. Current will also be established within the ground system, through the postulated ground fault, and thence back to the second phase through overcurrent protective device $P_2$. By appropriate adjustment of power resistor 16 so as to control the amount of current flow, it is normally possible to effect in this manner automatic actuation of the overcurrent protective device $P_2$ so as to isolate the ground fault from the system. It will be noted that in this case, the motor 38 of the timing relay 37 is connected to the first phase through contact 29 of the first relay. As in the previous case discussed with respect to phase 1, the motor 38 will cause the contact 36 of the timing relay 37 to open after the predetermined time period so as to cut off current flow.

Considering finally the situation which exists when the ground fault is associated with the third phase, it will be noted that in these circumstances overvoltage will be established between each of phases 1 and 2 and ground. In such a case, there will be actuation of both the first and second relays 21, 31. In this case, however, the contacts 28 of the first relay will be instantaneously actuated so as to cause connection of the winding 35 of the first contactor 17 between phases 1 and 2 through the normally closed contacts 33 of the second relay 31. At the same time, the normally closed contacts 27 of the first relay 21 will open so as to prevent connection of winding 40 of the second contactor 18 between the two phases, after the normally open contacts 32 of the second relay close following the predetermined time delay. At the same time as this occurs, the normally closed contacts 33 of the second relay will, of course, open, but by this time the auxiliary contacts 41 associated with the first contactor have been closed; since these auxiliary contacts are connected across the normally closed contacts 33 of the second relay, the circuit is maintained notwithstanding the delayed opening of the latter. In this case, the motor 38 of the timing relay 37 is connected between the first and second phases through both of the contacts 29 and 34. With the arrangement shown, therefore, current is thus established between the first phase and the ground, through the power resistor 16, thence through the ground circuit itself, including the ground fault, and back to the third phase through the appropriate overcurrent protective device $P_3$. Such current will cause actuation of the device $P_3$ so as to isolate from the system that part having the ground fault.

With the circuit as shown, it will be apparent that so long as the ground fault is cleared within the period prior to opening of the contacts 36 of the timing relay 37, the circuit will "re-set" itself. If, however, the ground fault is not so cleared, the circuit as shown in the drawings will not re-set. However, if a "repeat" type of operation were to be desired, the same could be obtained by the addition of an SPDT selector switch in the timing circuit whereby the timing motor could be connected either to the second phase 2 (as is shown in the figure) to provide a "one shot" type of operation, or to the left side of the normally closed contact 36 of the timing relay 37 so as to provide a "repeat" type of operation.

As will be apparent from the foregoing description, the invention provides a device which can readily be connected as close as possible to the main transformer bank or secondary switch board whenever a ground is detected on the system. The adjustment of the apparatus, and in particular the adjustment of the power resistor 16 should be such that the device is capable of tripping the overcurrent protection which is closest to the ground fault in the system. I have found on the basis of experience that the majority of ground faults occur on conductor sizes 8 to 16 AWG and on motors up to 20 H.P. with overcurrent protection in the range of 0 to 50 amps provided by fuses and molded case circuit breakers. The method and apparatus required, therefore, should be able to trip fuses of the range 0 to 60 amps and molded case circuit breakers in the range 0 to 50 amps in as short a time as possible in the interests of safety. It will be obvious that the maximum tripping current available is limited by the sizes of the components selected, and the requirement for any one plant will depend on an analysis of the connected loads on various substations.

As will be apparent to persons skilled in the art, apparatus according to my invention could be made in both portable and stationary versions. One portable device would in normal circumstances be sufficient for use in association with a plant having five substations and which is provided with ground detecting volt meters or lamp banks installed at each substation or at one central location. Where, however, six or more large substations are involved, it would normally be preferable to provide at each substation a permanently connected apparatus of the type described above. It would also, of course, be possible to include indicating and/or alarm devices at a central location which will show electrical maintenance personnel that the devices are operating and how many times they have operated in any one period.

What I claim is:
1. Apparatus for clearing ground faults occurring in a delta connected three-phase power distribution system which has a central panel feeding a plurality of branch circuits connected to power utilizing apparatus through overcurrent protective devices, said apparatus being adapted for connection between ground and first and second phases of said system at a point which is electrically adjacent said central panel and common to said branch circuits, said apparatus comprising:
   (a) first and second overvoltage detectors respectively connected between said first and second phases and ground, said detectors respectively including first and second switch means adapted for actuation upon the occurrence of overvoltage between the first and second phases and ground, respectively, and
   (b) a tripping current deriving circuit associated with said switch means adapted to be completed between either said first phase and ground or said second phase and ground upon actuation of said first or second detectors respectively for establishing between one of said phases and ground a current sufficient to actuate an overcurrent protective device,
whereby there is also established through said ground fault between ground and one of the other phases a current which effects actuation of the overcurrent protective device electrically closest to said fault.

2. Apparatus as claimed in claim 1 wherein said switch means effects establishment of said tripping current deriving circuit between said first phase and ground when the fault is associated with either the second or third phase, and between said second phase and ground when the ground fault is associated with said first phase.

3. Apparatus as claimed in claim 1 wherein the tripping current deriving circuit includes first and second contactors each having coils and contacts actuated thereby, connection means including said first and second switch means for selectively connecting one or the other of said coils between ground and said first or second phases, and a power resistor having one terminal connected to ground and the other terminal connected to said first or second phases through the contacts of said first or second contactors respectively.

4. Apparatus as claimed in claim 1 including a timing device adapted to break connection of said coils between said phases and ground a predetermined period of time after actuation of either of said switch means.

References Cited

UNITED STATES PATENTS

| | | | |
|---|---|---|---|
| 2,697,217 | 12/1954 | Jeffers | 317—18 X |
| 2,700,125 | 1/1955 | King et al. | 317—18 X |
| 3,158,785 | 11/1964 | Gagniere et al. | 317—18 |
| 3,160,786 | 12/1964 | Faglie | 317—27 |
| 3,184,644 | 5/1965 | Faglie | 317—27 |
| 3,259,802 | 7/1966 | Steen | 317—18 |

MILTON O. HIRSHFIELD, *Primary Examiner.*

R. V. LUPO, *Assistant Examiner.*